United States Patent
Cullen et al.

(10) Patent No.: US 8,985,432 B2
(45) Date of Patent: Mar. 24, 2015

(54) REUSABLE FOLDABLE SHIPPING CONTAINER

(71) Applicant: Rodair Holdings Ltd., Mississauga (CA)

(72) Inventors: Jeffrey J. Cullen, Toronto (CA); E. Leigh Goodwin, Mississauga (CA)

(73) Assignee: Rodair Holdings Limited, Mississauga, Ontario (CA)

( * ) Notice: Subject to any disclaimer, the term of this patent is extended or adjusted under 35 U.S.C. 154(b) by 0 days.

(21) Appl. No.: 14/061,113

(22) Filed: Oct. 23, 2013

(65) Prior Publication Data

US 2014/0117072 A1     May 1, 2014

Related U.S. Application Data

(60) Provisional application No. 61/720,168, filed on Oct. 30, 2012.

(51) Int. Cl.
| | |
|---|---|
| *B65D 5/36* | (2006.01) |
| *B65D 6/18* | (2006.01) |
| *B65D 25/28* | (2006.01) |
| *B65D 5/42* | (2006.01) |
| *B65D 5/62* | (2006.01) |
| *A45C 7/00* | (2006.01) |

(52) U.S. Cl.
CPC ............... *B65D 5/36* (2013.01); *A45C 7/0036* (2013.01); *B65D 11/1853* (2013.01); *B65D 25/2873* (2013.01); *B65D 5/4266* (2013.01); *B65D 5/62* (2013.01)
USPC .................... 229/117.05; 229/108.1; 206/170

(58) Field of Classification Search
USPC .................. 229/108.1, 117.05; D3/272, 276; 206/170; 493/311; 220/907, 915.2
See application file for complete search history.

(56) References Cited

U.S. PATENT DOCUMENTS

| | | | | |
|---|---|---|---|---|
| 2,485,028 | A | * | 10/1949 | Bauernfreund et al. .......... 220/6 |
| 3,119,547 | A | * | 1/1964 | Nute ......................... 229/117.06 |
| 3,319,684 | A | | 5/1967 | Calhoun |
| 4,793,507 | A | | 12/1988 | Delplanque |
| D311,452 | S | | 10/1990 | Ehret |
| 5,562,228 | A | | 10/1996 | Ericson |

(Continued)

OTHER PUBLICATIONS

Webpage downloaded from Eco Guardian website entitled "Basket Bag" [online]. Accessed on Aug. 23, 2012. Retrieved from the Internet: <URL http://www.ecoguardian.com/products/basket-bag>.

(Continued)

*Primary Examiner* — Christopher Demeree
(74) *Attorney, Agent, or Firm* — Bereskin & Parr LLP/S.E.N.C.R. L., s.r.l.

(57) ABSTRACT

A foldable container comprises a body having an interior chamber with a top opening and a closed bottom. The body includes two opposing short sidewalls and two opposing longer sidewalls that form a perimeter around the interior chamber. The short sidewalls are foldable along respective vertically extending fold lines. The container also includes a bottom panel positionable within the interior chamber to be laid against the closed bottom, and a lid hingedly coupled to the body for selectively closing the top opening. The bottom panel is hingedly coupled to the body and is foldable along a first horizontal fold line. Furthermore, the lid is foldable along a second horizontal fold line. The foldable sidewalls, bottom panel, and lid allow the container to be folded between an expanded position and a collapsed position.

20 Claims, 5 Drawing Sheets

(56) References Cited

U.S. PATENT DOCUMENTS

| | | | |
|---|---|---|---|
| 5,620,069 | A | 4/1997 | Hurwitz |
| 5,794,747 | A | 8/1998 | Bryant |
| 6,102,569 | A | 8/2000 | Wang |
| 7,011,224 | B2 | 3/2006 | Sheng-Bin |
| 7,143,932 | B2 * | 12/2006 | Wang ............ 229/117.35 |
| D575,059 | S | 8/2008 | Cappiello et al. |
| D582,676 | S | 12/2008 | Rothschild |
| D602,253 | S | 10/2009 | Rees et al. |
| 7,597,208 | B2 | 10/2009 | Wang |
| 7,815,024 | B1 | 10/2010 | Quimpo et al. |
| D646,059 | S | 10/2011 | Park |
| 8,608,050 | B2 * | 12/2013 | Seliger et al. ............ 229/117.16 |
| 2008/0283350 | A1 | 11/2008 | Vorderkunz |
| 2011/0127132 | A1 | 6/2011 | Fair et al. |
| 2011/0168598 | A1 | 7/2011 | Rees et al. |
| 2011/0220444 | A1 | 9/2011 | Perez |
| 2012/0267365 | A1 | 10/2012 | Sabounjian |
| 2013/0112686 | A1 | 5/2013 | Kwon |

OTHER PUBLICATIONS

Product Sheet downloaded from Eco Guardian website entitled "Basket Bag" [online]. Accessed on Aug. 23, 2012. Retrieved from the Internet: <URL http://www.ecoguardian.com/products/basket-bag>.
Webpage downloaded from Eco Guardian website entitled "Multi-Purpose Bags" [online]. Accessed on Aug. 23, 2012. Retrieved from the Internet: <URL http://www.ecogaurdian.com/multi-purpose-bags>.

* cited by examiner

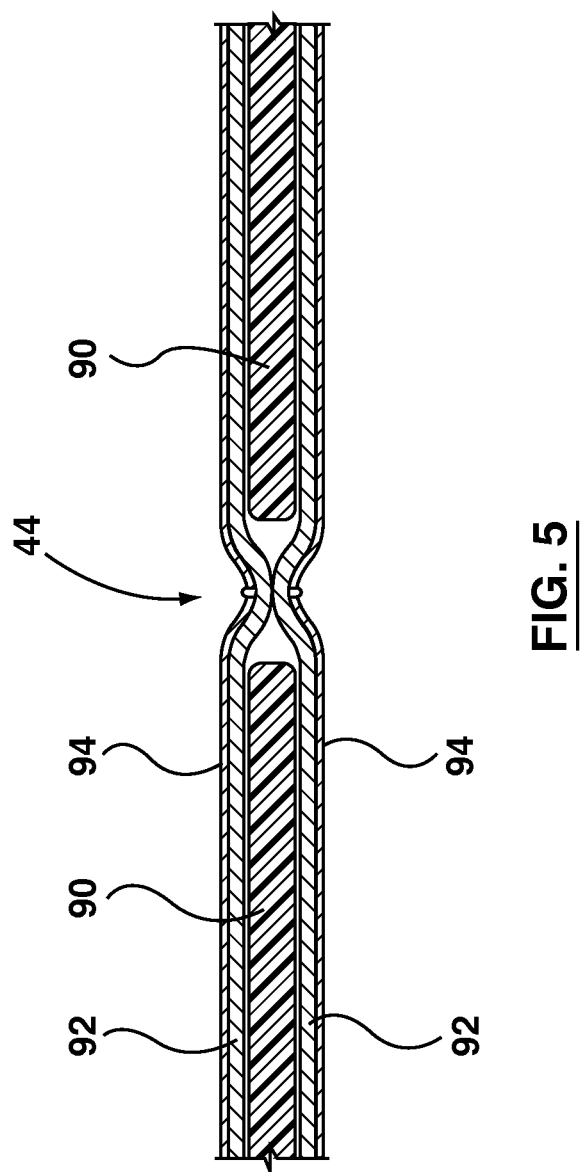

REUSABLE FOLDABLE SHIPPING CONTAINER

RELATED APPLICATIONS

This application claims the benefit of U.S. Provisional Patent Application Ser. No. 61/720,168 filed on Oct. 30, 2012, and entitled "Reusable Foldable Shipping Container", the entire contents of which are hereby incorporated by reference herein for all purposes.

TECHNICAL FIELD

The disclosure herein relates to containers for shipping merchandise, and in particular to reusable shipping containers that can be used multiple times.

BACKGROUND

Containers such as cardboard boxes are often used for shipping items such as clothing and other flat pack merchandise. However, these cardboard boxes are often flimsy and cannot be reused multiple times. Some reusable containers are made from stronger materials such as moulded plastic. However, these moulded plastic containers are often bulky and can take up considerable storage space when empty. Accordingly, there is a need for new or improved reusable shipping containers.

SUMMARY

According to some embodiments, there is provided a foldable container including a body having an interior chamber with a top opening and a closed bottom. The body includes two opposing first sidewalls and two opposing second sidewalls. The first sidewalls and the second sidewalls form a perimeter around the interior chamber. The first sidewalls are foldable along respective vertically extending fold lines. The container also includes a bottom panel and a lid. The bottom panel is positionable within the interior chamber and can be laid against the closed bottom. The bottom panel is hingedly coupled to the body and is foldable along a first horizontal fold line. The lid is hingedly coupled to the body for selectively closing the top opening. The lid is foldable along a second horizontal fold line. The container is foldable between an expanded position in which the body, the bottom panel, and the lid are unfolded, and a collapsed position in which the body, the bottom panel, and the lid are folded flat.

The first and second sidewalls, the lid, and the bottom panel may have a semi-rigid construction. For example, the first and second sidewalls, the lid, and the bottom panel may include a hard board encased within fabric. The fabric may be coated with an elastomeric coating. The fabric may be a non-woven fabric.

The container may include a set of carrying straps attached to the body. The carrying straps may be attached to the second sidewalls. The carrying straps may form loops that hang no lower than the closed bottom of the body.

The lid of the container may have an exterior surface with a clear pouch for receiving a shipping label.

The container may include a zipper for securing the lid around the top opening.

The vertical fold lines, the first horizontal fold line, and the second horizontal fold line may be bisectors.

The bottom panel may be hingedly coupled to the body along a first living hinge. The first living hinge may be located along a boundary between the closed bottom and one of the first and second sidewalls. The bottom panel may have a free end opposite the living hinge.

The closed bottom may be made from a flexible material.

Other aspects and features will become apparent, to those ordinarily skilled in the art, upon review of the following description of some exemplary embodiments.

BRIEF DESCRIPTION OF THE DRAWINGS

Some embodiments of the present specification will now be described, by way of example only, with reference to the following drawings, in which:

FIG. 5 is a cross-section view of a foldable sidewall of the shipping container of FIG. 1.

DETAILED DESCRIPTION OF THE INVENTION

Figure 1:
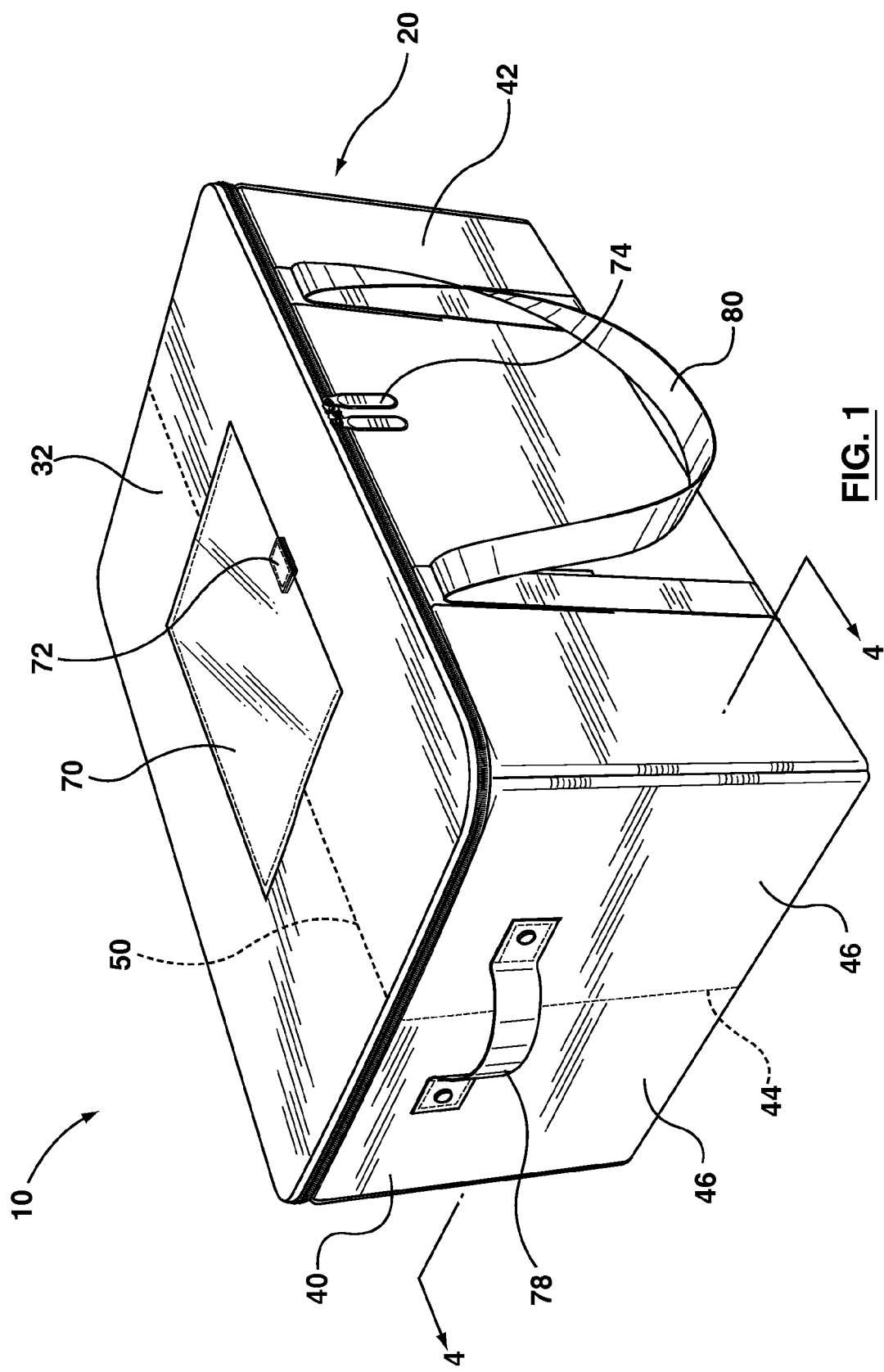
FIG. 1 is a perspective view of a foldable reusable shipping container in an expanded position according to one embodiment.

Referring to FIGS. 1-4, illustrated therein is a foldable reusable shipping container 10. The container 10 includes a body 20 having an interior chamber 22 with a top opening 24 and a closed bottom 26. The container 10 also includes a foldable bottom panel 30 located within the interior chamber 22 (shown in FIGS. 2 and 4), and a foldable lid 32 hingedly coupled to the body 20 for selectively closing the top opening 24. The container 10 is foldable between an expanded position in which the body 20, the bottom panel 30, and the lid 32 are unfolded (shown in FIG. 1), and a collapsed position in which the body 20, the bottom panel 30, and the lid 32 are folded flat (shown in FIG. 3). This can allow compact storage of the container 10, for example, when it is empty.

The closed bottom 26 of the body 20 is generally made from a non-rigid sheet of flexible material such as a fabric. The flexibility of the sheet allows the closed bottom 26 to crumple or otherwise come together when folding the container 10 into the collapsed position. Furthermore, when the container 10 is in the expanded position, the closed bottom 26 supports the bottom panel 30 as well as items within the container 10. In other words, the bottom of the container 10 includes two separate layers, namely, the fabric closed bottom 26 and the bottom panel 30.

Figure 2:
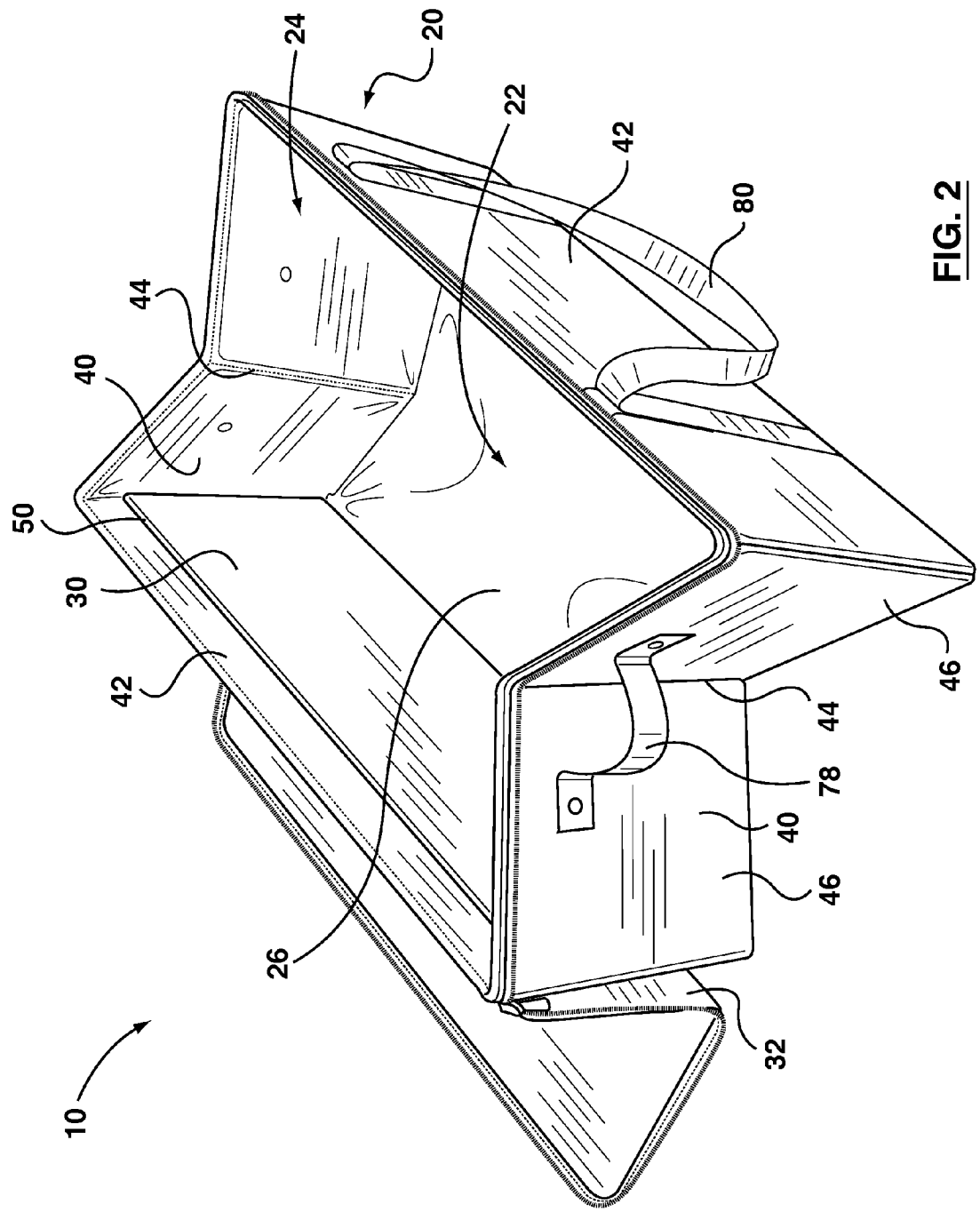
FIG. 2 is a perspective view of the shipping container of FIG. 1 being folded to a collapsed position.

Referring now to FIGS. 1 and 2, the body 20 includes a plurality of sidewalls 40, 42. The sidewalls 40, 42 are interconnected and form a perimeter around the interior chamber 22. In the illustrated embodiment, there are two opposing short sidewalls 40, and two opposing longer sidewalls 42. The sidewalls 40, 42 define a generally rectangular perimeter around the interior chamber 22. In other embodiments, the sidewalls 40, 42 may be arranged to provide containers having other shapes and sizes such as a container with a square shaped interior chamber.

Some of the sidewalls 40, 42 are foldable, which allows the container 10 to be folded into the collapsed position. For example, in the illustrated embodiment, the short sidewalls 40 are foldable along respective vertically extending fold lines 44. Each fold line 44 subdivides the respective sidewall 40 into two adjoining sections 46. In the expanded position, the sections 46 are generally co-planar. In the collapsed position, the sections 46 are generally folded against each other about the fold line 44. When folding the container 10 to the collapsed position, the short sidewalls 40 fold inwardly into the interior chamber 22. At the same time, the longer sidewalls 42 are drawn closer together to collapse the interior chamber 22. In other embodiments, the longer sidewall 42 may be foldable instead of the short sidewalls 40.

As shown, the fold line 44 may be a bisector such as a central crease that divides the sidewall 40 in half. Accordingly, both sections 46 of the sidewall 40 are generally similar in size and shape. This allows the sidewall 40 to be folded in half in the collapsed position, which can make it easier to transport or store the container 10 when empty.

The body 20 is generally configured to allow the sidewalls 40, 42 to be folded together. This may be achieved by making the closed bottom 26 from a sheet of flexible material as described above. Furthermore, the closed bottom 26 may be sized and shaped so that the flexible sheet is pulled taut when the sidewalls 40, 42 are unfolded into the expanded position. This may help define the shape of the interior chamber 22.

Figure 4:
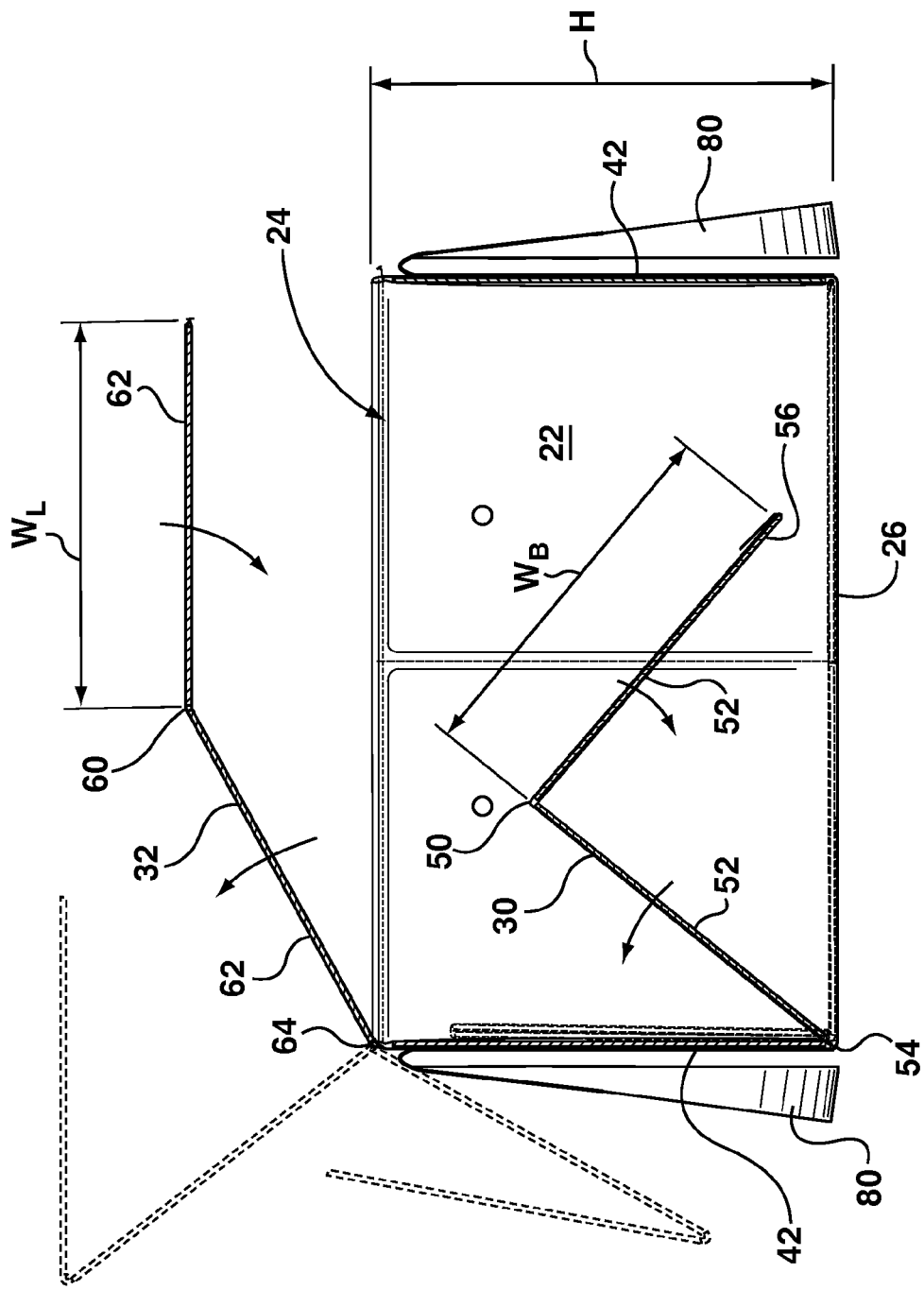
FIG. 4 is a cross-sectional side view of the shipping container of FIG. 1 along the line 4-4 in which the bottom panel and lid are being folded to the collapsed position.

Referring now to FIG. 4, the bottom panel 30 is located within the interior chamber 22 of the body 20 and is foldable along a horizontal fold line 50. The fold line 50 subdivides the bottom panel 30 into two adjoining sections 52. In the unfolded and expanded position, the sections 52 are generally co-planar and lie against the closed bottom 26 of the body 20. In the folded and collapsed position, the sections 52 are generally folded against each other about the fold line 50 and rest against one of the sidewalls 42 (e.g. the left sidewall 42 as shown in FIG. 4).

As shown, the fold line 50 may be a bisector such as a central crease that divides the bottom panel 30 in half. Accordingly, both sections 52 are generally similar in size and shape.

The bottom panel 30 may be sized and shaped to be contained within the interior chamber 22 when folded. For example, the sidewalls 40, 42 may have a height H, and each section 52 of the bottom panel 30 may have a width $W_B$ that is selected to be of similar size as the height H of the sidewalls 40, 42. More specifically, the width $W_B$ may be less than, or approximately equal to, the height H. Accordingly, when folded, the bottom panel 30 may have a similar footprint as the sidewall 42, and thus, may be contained within the interior chamber 22 as opposed to extending outwardly through the top opening 24.

As shown in the illustrated embodiment, the bottom panel 30 is hingedly coupled to the body 20. More particularly, the bottom panel 30 is hingedly coupled to the body 20 along a living hinge 54. The living hinge 54 may be located along a boundary between the closed bottom 26 and one of the longer sidewalls 42. Furthermore, the living hinge 54 may be formed by attaching the bottom panel 30 to the body 20, for example, using stiches, adhesive, or another fastening technique. The bottom panel 30 could also be formed integrally with the body 20 using a continuous piece of fabric.

The bottom panel 30 has a free end 56 located opposite to the living hinge 54. The free end 56 may move inwardly toward the living hinge 54 when folding the bottom panel 30.

While the bottom panel 30 is shown as being hingedly coupled to the body 20, in other embodiments the bottom panel 30 may be coupled to the body 20 in other ways. Alternatively, the bottom panel 30 may be separate and removable from the body 20.

Referring still to FIG. 4, the lid 32 is foldable along a horizontal fold line 60. The fold line 50 subdivides the lid 32 into two adjoining sections 62. In the unfolded and expanded position, the sections 62 are generally co-planar and cover the top opening 24. In the folded and collapsed position, the sections 52 are generally folded against each other about the fold line 50 and rest against the outside of one of the sidewalls 42 (e.g. the left sidewall 42 as shown in FIG. 4).

As shown, the fold line 60 may be a bisector such as a central crease that divides the lid 32 in half. Accordingly, both sections 62 are generally similar in size and shape.

The lid 32 may be configured to have a similar size and shape as the sidewalls 42 when folded. For example, each section 62 of the lid 32 may have a width $W_L$ that is selected to be of similar size as the height H of the sidewalls 40, 42. More specifically, the width $W_L$ may be less than, or approximately equal to, the height H. Accordingly, when folded, the lid 32 may have a similar footprint as the sidewall 42. This may allow more compact folding and storage of the container 10.

As described previously, the lid 32 is hingedly coupled to the body 20. For example, the lid 32 may be hingedly coupled to the body 20 along a living hinge 64. The living hinge 64 may be located along a boundary between the top opening 24 and one of the longer sidewalls 42. The living hinge 64 may be formed by attaching the lid 32 to the sidewall 42 using stiches, adhesive, or another fastening technique. The lid 32 could also be formed integrally with the sidewall 42 using a continuous piece of fabric.

Referring now to FIG. 1, the lid 32 has an exterior surface. In some embodiments, the lid 32 may include a clear pocket 70 located on the exterior surface. The pocket 70 may be sized and shaped to receive a shipping label or an information label. This can help identify the contents of the shipping container 10. The lid 32 may also include a hook and loop fastener 72 (such as Velcro™) or another type of fastener for retaining the shipping label within the pocket 70.

The container 10 may include a zipper 74 or another type of fastener for securely closing the lid 32 around the top opening 26. The zipper 74 may extend generally around the top opening 26. For example, the zipper 74 may extend around three sides of the top opening 26 with the living hinge 64 extending along the fourth side. Alternatively, the zipper 74 may extend around the entire top opening 26 such that the zipper 74 forms the living hinge 64. This may allow the lid 32 to be removable.

As shown, the zipper 74 may be a double zipper closure with two sliding tabs. This may allow a security device such as a padlock to be secured around the two sliding tabs so as to lock and secure the items within the container 10.

The container 10 may include a set of side handles 78 attached to the body 20. For example, the side handles 78 may be fabric straps attached to the short sidewalls 40.

The container 10 may include carrying straps 80 attached to the body 20. The carrying straps 80 may be made of fabric strips sewn to the longer sidewalls 42. The straps 80 may be reinforced to support the weight of the container 10 when full of items.

Referring to FIG. 4, the carrying straps 80 may form loops that hang down along the body 20. In some embodiments, the loops may hang no lower than the closed bottom 26 of the body 20. This may reduce the likelihood of the straps 80 becoming stuck underneath of the container 10, or becoming tangled in conveyor belts or other equipment used in the shipping industry.

The container 10 generally has a semi-rigid construction that allows the sidewalls 40, bottom panel 30, and lid 32 to be folded while still providing strength and support. For example, with reference to FIG. 5, the sidewalls 40 and 42, the bottom panel 30, and the lid 32 may be made from hard boards 90 encased within fabric 92. The hard boards 90 may provide rigidity and buckling resistance, and the fabric 92 may allow the container 10 to be folded along the fold lines 44, 50 and 60. For example, as shown in FIG. 5, the fold line 44 may be defined by a seam of fabric located between the hard boards 90.

The hard boards 90 may be made from plastic, cardboard, or another rigid or semi-rigid material. For example, the boards 90 may be made from polypropylene boards having a thickness of about 2 millimeters. The fabric 92 may be a non-woven fabric such as polypropylene or another flexible plastic material. More particularly, the fabric 92 may be non-woven polypropylene having an area density of about 100 grams-per-square-meter.

In other embodiments, the fabric 92 could be a woven fabric or another material. The fabric 92 could also be coated or uncoated. Furthermore, the container 10 may be made from recyclable materials, such as recycled cardboard and/or recycled plastics.

The materials used to construct the container 10 may be selected to support a particular amount of weight within the container 10. For example, the materials used may be selected to support a weight of about 25-pounds. In other embodiments, the container 10 may be constructed to support more or less weight.

It is understood that the semi-rigid construction provided by the boards 90 can also provide impact resistance. This may help protect the contents of the container 10 from being damaged during shipment.

The semi-rigid construction of the container 10 can also provide buckling resistance (e.g. due to the hard boards 90). This buckling resistance can allow two or more containers 10 to be stacked on top of each other when loaded with items.

In use, when it is desired to ship or store items within the container 10, the container 10 is unfolded to the expanded position. This is done by pulling apart the longer sidewalls 42 so that the short sidewalls unfold to expand the interior chamber 22. The bottom panel 30 can then be unfolded and laid against the closed bottom 26. Items, including flat pack merchandise such as clothing, can then be loaded in the interior chamber 22. Afterwards, the container 10 can be closed by unfolding the lid 32 and securing it around the top opening 24 using the zipper 74. When unloading the container 10, the process is reversed and the container 10 can be folded back down into the collapsed position for storage.

Figure 3:
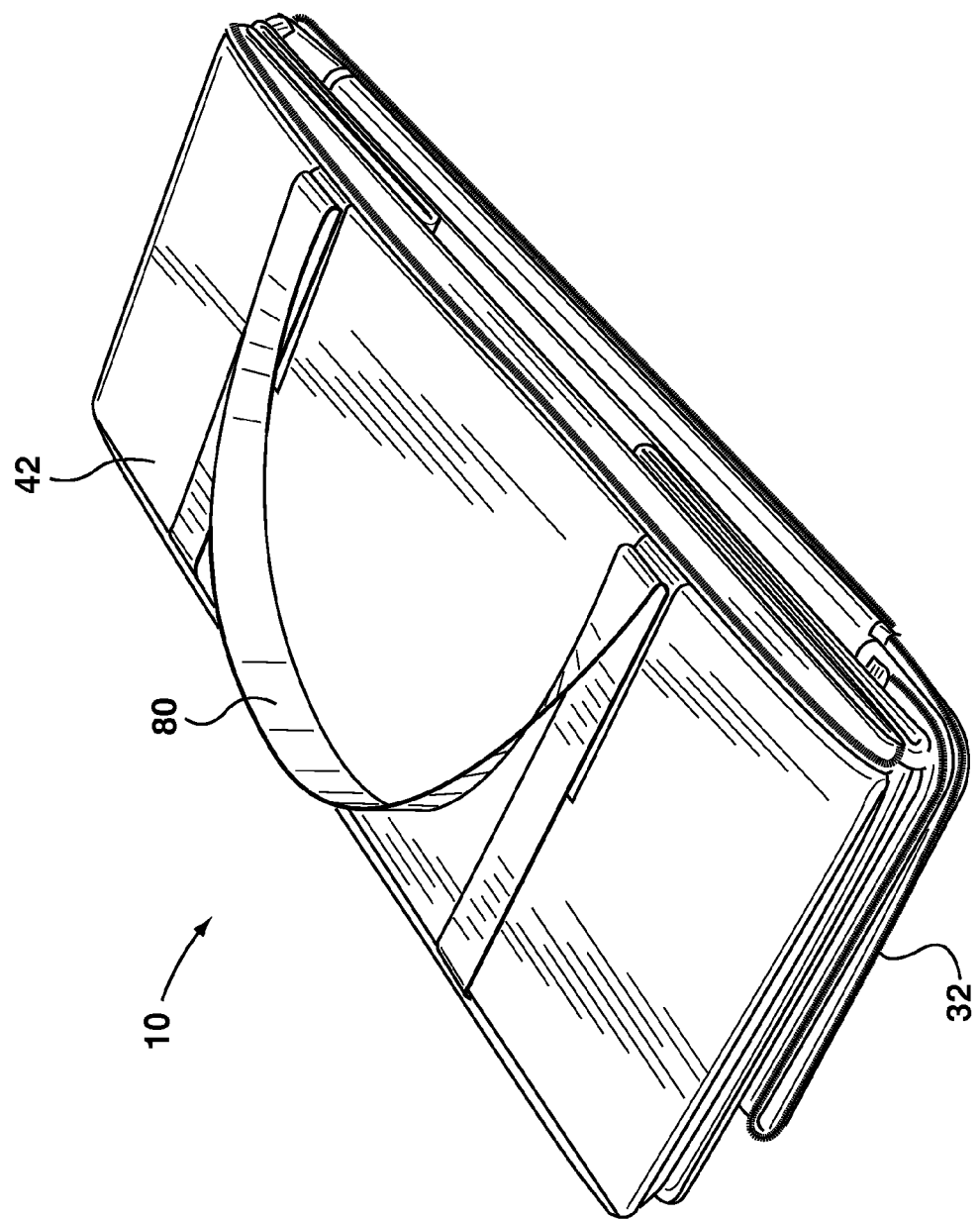
FIG. 3 is a perspective view of the shipping container of FIG. 1 folded into the collapsed position.

When not in use, the container 10 may be stored in the folded or collapsed position as shown in FIG. 3. In this configuration, it may be possible to store a number of containers 10 within a small space. For example, the container 10 may be sized and shaped so that twenty-four folded containers 10 fit within one expanded container 10. This can be useful when returning the containers 10 to a distributor for reuse.

The configuration of the foldable sidewalls 40, bottom panel 30 and lid 32 can allow easy folding and unfolding of the container 10. In some cases, it may be possible to unfold the container 10 and place it in the expanded position faster than assembling a standard cardboard box of similar size. For example, some tests have shown that the container 10 can be assembled 15% faster than a standard cardboard box.

The reusable nature of the shipping container 10 can provide an eco-friendly method of shipping items. Furthermore, when returning the containers 10 to a distributor for reuse, the light weight and compact folding of the containers 10 can reduce the amount of cargo space needed to return the containers. This can reduce transportation costs and can also reduce environmental impact by lowering fuel consumption.

While the above description provides examples of one or more apparatus, methods, or systems, it will be appreciated that other apparatus, methods, or systems may be within the scope of the claims as interpreted by one of skill in the art.

The invention claimed is:

1. A foldable container comprising:
   (a) a body having an interior chamber with a top opening and a closed bottom, the body including two opposing first sidewalls and two opposing second sidewalls, the first sidewalls and the second sidewalls forming a perimeter around the interior chamber, the first sidewalls being foldable along respective vertical fold lines;
   (b) a bottom panel positionable within the interior chamber to be laid against the closed bottom, the bottom panel being hingedly coupled to the body and being foldable along a first horizontal fold line that subdivides the bottom panel into two adjoining bottom sections, wherein the first horizontal fold line is perpendicular to the first sidewalls; and
   (c) a lid hingedly coupled to the body for selectively closing the top opening, the lid being foldable along a second horizontal fold line that subdivides the lid into two adjoining lid sections;
   (d) the container being foldable between:
      (i) an expanded position in which the body, the bottom panel, and the lid are unfolded; and
      (ii) a collapsed position in which the body, the bottom panel, and the lid are folded flat.

2. The container of claim 1, wherein the first and second sidewalls, the lid, and the bottom panel have a semi-rigid construction.

3. The container of claim 2, wherein the first and second sidewalls, the lid, and the bottom panel include a hard board encased within fabric.

4. The container of claim 3, wherein the fabric is coated with an elastomeric coating.

5. The container of claim 3, wherein the fabric is a non-woven fabric.

6. The container of claim 3, wherein the hard board is made of plastic.

7. The container of claim 1, further comprising a set of carrying straps attached to the body.

8. The container of claim 7, wherein the carrying straps are attached to the second sidewalls.

9. The container of claim 8, wherein the carrying straps form loops that hang no lower than the closed bottom of the body.

10. The container of claim 1, wherein the lid has an exterior surface with a clear pouch for receiving a shipping label.

11. The container of claim 1, further comprising a zipper for securing the lid around the top opening.

12. The container of claim 1, wherein the vertical fold lines, the first horizontal fold line, and the second horizontal fold line are bisectors.

13. The container of claim 1, wherein the bottom panel is hingedly coupled to the body along a first living hinge.

14. The container of claim 13, wherein the first living hinge is located along a boundary between the closed bottom and one of the first and second sidewalls.

15. The foldable container of claim 13, wherein the bottom panel has a free end opposite the living hinge.

16. The container of claim 1, wherein the closed bottom is made from a flexible material.

17. The container of claim 1, wherein the second sidewalls are longer than the first sidewalls.

18. A foldable container comprising:
   (a) a body having an interior chamber with a top opening and a closed bottom, the body including two opposing first sidewalls and two opposing second sidewalls, the first sidewalls and the second sidewalls forming a perimeter around the interior chamber, the first sidewalls being foldable along respective vertical fold lines;

(b) a bottom panel positionable within the interior chamber to be laid against the closed bottom, the bottom panel being foldable along a first horizontal fold line that subdivides the bottom panel into two adjoining bottom sections, wherein the first horizontal fold line is perpendicular to the first sidewalls; and (c) a lid for selectively closing the top opening, the lid being foldable along a second horizontal fold line that subdivides the lid into two adjoining lid sections;

(d) the container being foldable between:
  (i) an expanded position in which the body, the bottom panel, and the lid are unfolded; and
  (ii) a collapsed position in which the body, the bottom panel, and the lid are folded flat.

19. The container of claim 18, wherein the bottom panel is hingedly coupled to the body, and the lid is hingedly coupled to the body.

20. The container of claim 18, wherein the vertical fold lines, the first horizontal fold line, and the second horizontal fold line are bisectors.

\* \* \* \* \*